No. 788,409. PATENTED APR. 25, 1905.
G. P. KIRKPATRICK.
RIDING ATTACHMENT FOR HARROWS.
APPLICATION FILED JULY 9, 1904.
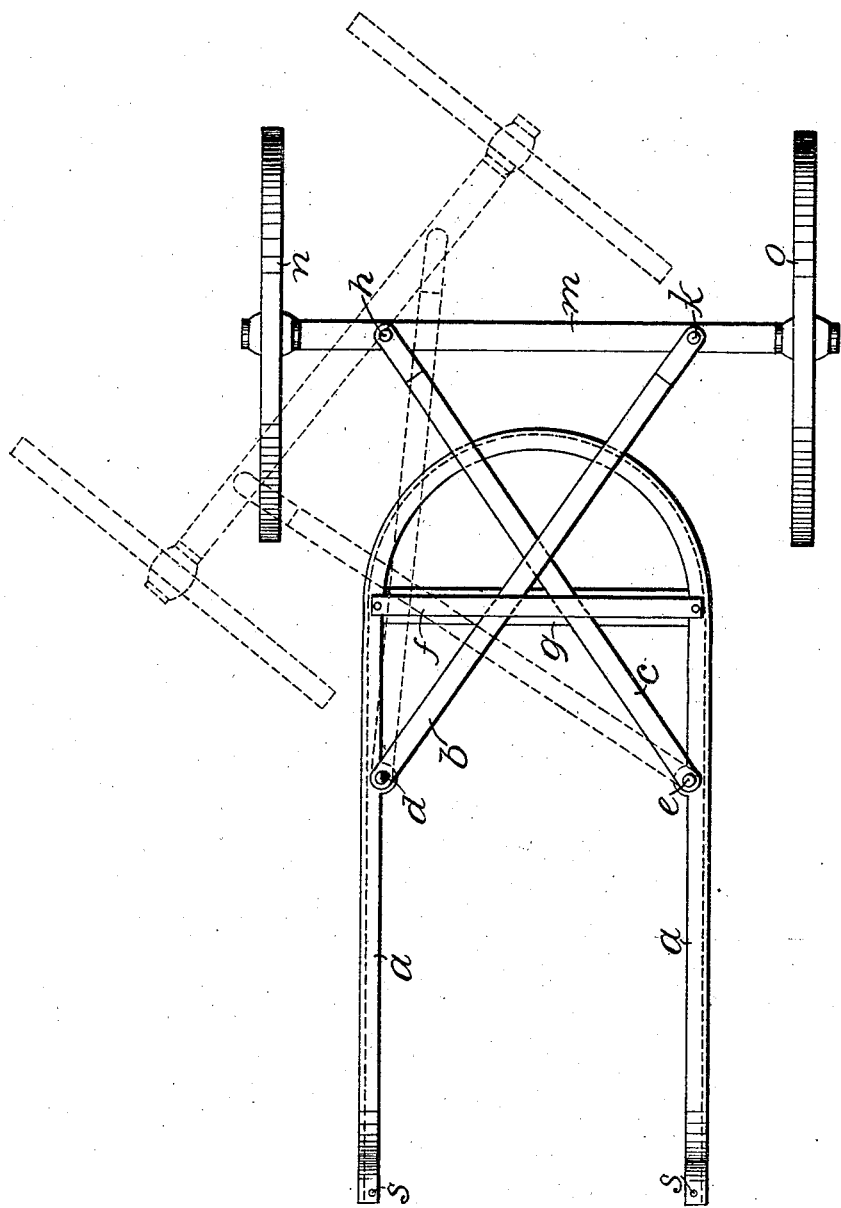
WITNESSES:
George P. Kirkpatrick,
INVENTOR.
BY G. C. Kennedy,
ATTORNEY.

No. 788,409. Patented April 25, 1905.

UNITED STATES PATENT OFFICE.

GEORGE P. KIRKPATRICK, OF WHITTEMORE, IOWA, ASSIGNOR OF TWO-THIRDS TO DAVID J. WILSON, OF WATERLOO, IOWA, AND CHARLES GANGE, OF ALGONA, IOWA.

RIDING ATTACHMENT FOR HARROWS.

SPECIFICATION forming part of Letters Patent No. 788,409, dated April 25, 1905.

Application filed July 9, 1904. Serial No. 215,914.

*To all whom it may concern:*

Be it known that I, GEORGE P. KIRKPATRICK, a citizen of the United States of America, and a resident of Whittemore, Kossuth county, Iowa, have invented certain new and useful Improvements in Riding Attachments for Harrows, of which the following is a specification.

My invention relates to improvements in riding attachments for harrows; and the object of my invention is to provide means whereby the wheels following the harrow will be kept in line and prevented from dragging the harrow out of line or otherwise displacing it. This object I have accomplished by the means which are hereinafter described and claimed and which are illustrated in the accompanying drawing, which is a plan view of my riding attachment, showing it connected up to the axle of the wheels of a riding-harrow.

The frame of the attachment is formed of angle-iron whose flange is turned downward and is of an elongated horseshoe shape. The cross-pieces $b$ and $c$ are pivoted to the frame $a$ by the bolts $d$ and $e$ and are pivoted to the axle $m$ by the bolts $h$ and $k$. Said cross-pieces $b$ and $c$ cross and are slidable over each other, as shown, and are kept from vertical displacement by means of the cross-bars $f$ and $g$, which are spaced apart sufficiently to allow the cross-pieces $b$ and $c$ to play between them, and extend parallel to each other and transversely across the frame $a$, to which they are fastened. The ends of the cross-pieces $b$ and $c$ which are pivoted to the axle $m$ may be forked, as shown, or otherwise pivoted to said axle. The other ends of the said cross-pieces may also be otherwise connected to the frame $a$ than as shown, not varying the principle of my invention.

The dotted lines in the drawing show the relative positions of the parts when the implement is being shifted to turn a corner. The use of these pivoted cross-pieces $b$ and $c$ affords greater ease in turning the implement, gives greater play to the axle, and tends to prevent the wheels from dragging the harrow out of line if they are in contact with any rut or obstruction. It is obvious that this improved riding attachment is susceptible of being usefully connected to other forms of implements by making slight structural changes therein which will not affect the principle of my invention.

The bolt-holes $s$ are used for connecting up the frame $h$ to the rear of a harrow or other implement, (not shown,) and it is of course obvious that, if desired, the frame $a$ might be entirely omitted and the forward ends of the cross-pieces pivotally connected by the bolts $d$ and $e$ to the rear end of such harrow or other implement.

Having described my invention, what I claim as new, and desire to secure by Letters Patent, is—

A riding attachment, consisting of a frame, cross-bars on said frame, wheels rotatably mounted on an axle, an axle, and cross-pieces pivotally connected to said frame and to said axle and slidable over each other between said cross-bars, substantially as shown and described.

Signed at Algona, Iowa, this 2d day of July, 1904.

GEORGE P. KIRKPATRICK.

Witnesses:
L. J. DECKENSON,
C. BYRON.